(12) United States Patent
Laperriére (10) Patent No.: US 6,400,368 B1
(45) Date of Patent: *Jun. 4, 2002

(54) SYSTEM AND METHOD FOR CONSTRUCTING AND USING GENERALIZED SKELETONS FOR ANIMATION MODELS

(75) Inventor: Richard Laperriére, Montreal (CA)

(73) Assignee: Avid Technology, Inc., Tewksbury, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 08/821,148

(22) Filed: Mar. 20, 1997

(51) Int. Cl.[7] .............................. G06T 15/70
(52) U.S. Cl. .................. 345/473; 345/474; 345/475; 345/420; 345/619; 345/622
(58) Field of Search ................. 345/473, 474, 345/475, 420, 619, 622

(56) References Cited

U.S. PATENT DOCUMENTS

| | | | | |
|---|---|---|---|---|
| 4,600,919 A | * | 7/1986 | Stern | 345/473 |
| 5,623,428 A | * | 4/1997 | Kunii et al. | 345/473 |
| 5,692,117 A | * | 11/1997 | Berend et al. | 345/452 |
| 5,754,189 A | * | 5/1998 | Doi et al. | 345/473 |
| 5,818,452 A | * | 10/1998 | Atkinson et al. | 345/420 |
| 5,889,532 A | * | 3/1999 | Boucher et al. | 345/473 |

OTHER PUBLICATIONS

John E. Chadwick, "Layered Construction for Deformable Animated Characters", Computer Graphics, vol. 23, No. 3, Jul. 1989, pp. 244,248.*

Nadia Magnenat–Thalmann, Richard Lapperrière and Daniel Thalmann, "Joint–Dependent Local Deformations For Hand Animation And Object Grasping", Graphics Interface '88, pp. 26–33, 1988.

SoftImage/3D, A Comprehensive User's Guide, Version 3.0,"Actor Module—Basic Concepts" pp. 4–1 to 4–116, 1995.

* cited by examiner

*Primary Examiner*—Mark Zimmerman
*Assistant Examiner*—Kimbinh T. Nguyen
(74) *Attorney, Agent, or Firm*—Peter J. Gordon (57) ABSTRACT

A method and system for constructing a skeleton for use in animation models allows definition of a skeleton with non-articulated chain elements. These non-chain elements can be 3D objects, which can be rendered and visible in final images and animations, or null models which are not visible in final images or animations. All of the elements of the skeleton, including non-chain elements, are arranged into a skeleton hierarchy. The skeleton hierarchy can include articulated chain elements, articulated chain elements combined with non-chain elements, or solely non-chain elements. Relational information and/or mathematical relationships can be defined for the elements of the skeleton to define ranges of motion, elements which move with other elements and/or translation, rotation, scaling and/or animation of elements.

43 Claims, 13 Drawing Sheets

SYSTEM AND METHOD FOR CONSTRUCTING AND USING GENERALIZED SKELETONS FOR ANIMATION MODELS

FIELD OF THE INVENTION

The present invention relates to a system and method for constructing and using models for computer animations. More specifically, the present invention relates to constructing and using generalized skeletons in models for computer animations, the models comprising one or more skeletons to which envelopes can be associated.

BACKGROUND OF THE INVENTION

One of the types of objects which is commonly desired to be animated in a computer animation system are animals and/or humans. To animate such objects, and many others, the animation artist will construct an animation model, which can be animated by inverse kinematics, forward kinematics, dynamics, and/or other procedures, and the rendering engine of the animation system will use this model to render the animation as required.

In the V3.0 and earlier versions of the SOFTIMAGE|3D product sold by the assignee of the present invention, such animation models are constructed of skeletons which comprise a hierarchy of one or more articulated chains to which the vertices of one or more envelopes can subsequently be assigned to. In general, the skeletons define the types and ranges of movement of the model. In V3.0 of SOFTIMAGE|3D, a human animation model can be constructed from a skeleton comprising a hierarchy of articulated chains, each of which models a limb, torso, or other features, which are connected at articulation points.

The skeleton is not rendered in the rendering engine of the animation system and is thus not directly visible in the output of the animation system. Instead, in V3.0 of SOFTIMAGE|3D the skeleton can have one or more envelopes associated with it and these envelopes are rendered and result in the visual appearance of the model produced by the rendering engine of the animation system.

Generally, there are two types of envelopes which are employed with skeletons, rigid envelopes and flexible envelopes. Rigid envelopes move with the skeleton, but the shape of the rigid envelope does not deform as the skeleton is moved. In contrast, flexible envelopes act much like skin, moving and deforming with the elements in the skeleton as the chains therein are animated using forward or inverse kinematics, etc. Such animation models can be employed to animate humans, other bipeds, quadrupeds, etc. including animals, dinosaurs, etc. and various objects. This type of technique was, for example, used to animate the Tyrannosaurus Rex in the film Jurassic Park.

In the above-mentioned SOFTIMAGE|3D product, each articulated chain used to construct a skeleton is a hierarchy of elements comprising a root, one or more joints and an end effector, each element being spaced at a fixed distance from the preceding and/or subsequent element in the chain. In a similar manner, the skeleton itself comprises a hierarchy of these articulated chains. For example, the skeleton hierarchy for a human model can include a root (highest level entry) from which a chain representing a torso depends and a chain representing an arm can depend from an element of the torso and a chain representing a hand can depend from the end effector of the chain representing the arm.

The joint elements in the chain define the articulation points of the chain, both in terms of their location and their articulation capabilities. For example, in a chain for a human arm, a joint representing an elbow can be located approximately half way between the root and the end effector and may be defined to allow pivoting in a limited range within a 2D plane to mimic the range of movement of a human elbow.

The end effector is the last point in a chain hierarchy and the end effector is manipulated for forward and inverse kinematic purposes. The end effector of one chain can be defined as the parent of the root of another chain. In the example of the human skeleton mentioned above, the end effector of the chain representing a human arm can be defined as the parent of the root element of a chain representing a human hand, and thus the hand will move with the arm as the arm is animated.

As also mentioned above, envelopes are assigned to the skeleton to provide the desired visual volume of the animated character or object. A flexible envelope essentially is a volume defined by a series of vertices which are associated with a chain, two or more chains or an entire skeleton and which moves and/or deforms as the associated chain elements are moved. Thus, the skeleton and chains used to model the Tyrannosaurus Rex in Jurassic Park are not visible to the film's audience, who instead see only the flexible envelope "skin" of the dinosaur which deforms and moves as the skeleton of the dinosaur model is animated.

As is known, the assignment of the vertices of flexible envelopes to chain elements can be either exclusive (i.e. a vertex is assigned to a single chain element) or weighted to two or more elements (i.e. a vertex is assigned to a first chain element with a 60% weighting and a second chain element with a 40% weighting).

This arrangement has proven to be an acceptable technique for many models. However, in animating models or portions of models which require greater local control, such as the local control required to model the bulge of a flexing biceps muscle or the movement of a human face, the necessary local control can be difficult to obtain.

Also, while for simple models or portions of models, such as limbs, the flexible envelope can be a simple geometric volume such as a tube, in modelling more complex objects, such as hands, feet and faces, the envelopes themselves can become more complex, both in shape and in the number of vertices, and often require great effort on the part of the animation artist to provide the necessary level of control of the envelope's deformation.

Further, the construction of an articulated chain for these more complex portions of a model is much more difficult. For example, to ensure that the flexible envelope realistically deforms to animate a human smile, the portion of a model representing a human face can require many tens of chain elements to be located within a relatively small volume. For such complex models, defining a skeleton of articulated chains with the requisite number of elements to provide the desired level of control is, at best, onerous and, at worst, impossible.

Specifically, the structure of articulated chains impose limitations in that each element in the chain is dependent, by definition, on other elements in the chain and therefore elements cannot be independently transformed by scaling, rotation and/or translation. Thus, for example, translating a joint representing the elbow in a chain which models an arm results in movement of the end effector of the chain (i.e. the elbow cannot be moved up and down the fore arm). There are also explicit and implicit constraints controlling the behaviour of the chain, such as the orientation of the elements and the requirement that the spacing between elements has a fixed length that cannot be changed relative to the preceding and/or subsequent element.

Accordingly, in the past the desired level of control in complex models such as a human face has been provided, at least in part, by "dummy" chains which are linked to the hierarchy of the skeleton. These "dummy" chains are commonly used to isolate some parts of the skeleton and/or to add a level of local control at specific points relative to the skeleton. However, while the inclusion of such "dummy" chains in a skeleton can provide an enhanced level of control, the result is cumbersome to use and to construct and is still limited in its capabilities.

It is desired to have a method of constructing and using animation models which includes the utility of skeletons, but which avoids at least some of the disadvantages and/or limitation of skeletons of articulated chains

SUMMARY OF THE INVENTION

It is an object of the present invention to provide a novel system and method for constructing and using a skeleton for an animation model which obviates or mitigates at least one of the disadvantages of the prior art systems.

According to one aspect of the invention, there is provided a method of constructing a generalized skeleton for an animation model, comprising the steps of:

(i) defining a set of at least two elements to be included in said skeleton, said set including at least one non-chain element;

(ii) arranging said set of elements into a skeleton hierarchy; and (iii) defining for each said element in said set relational information and/or mathematical relationships between said element and at least one other element in said set.

According to another aspect of the invention, there is provided a method of constructing an animation model including a skeleton and at least one envelope, comprising the steps of:

(i) defining a set of at least two elements to be included in said skeleton, at least one element of said set being a non-chain element;

(ii) arranging said set of elements into a skeleton hierarchy;

(iii) defining for each element in said set information comprising a relational and/or mathematical relationship between said element and at least one other element in said set;

(iv) selecting at least one envelope for use with said skeleton; and (v) assigning the vertices of said at least one envelope to at least one element in said set.

According to yet another aspect of the invention, there is provided an animation system comprising:

element input means to allow a user to define a set of elements including at least one non-chain element;

hierarchical input means to allow said user to arrange said set of elements into a skeleton hierarchy;

relational input means to allow said user to define relational information and/or mathematical relationships for each element in said set;

envelope input means to allow said user to assign vertices of at least one envelope to elements in said set;

animation means to move said skeleton elements; and rendering means to render images of said at least one envelope.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
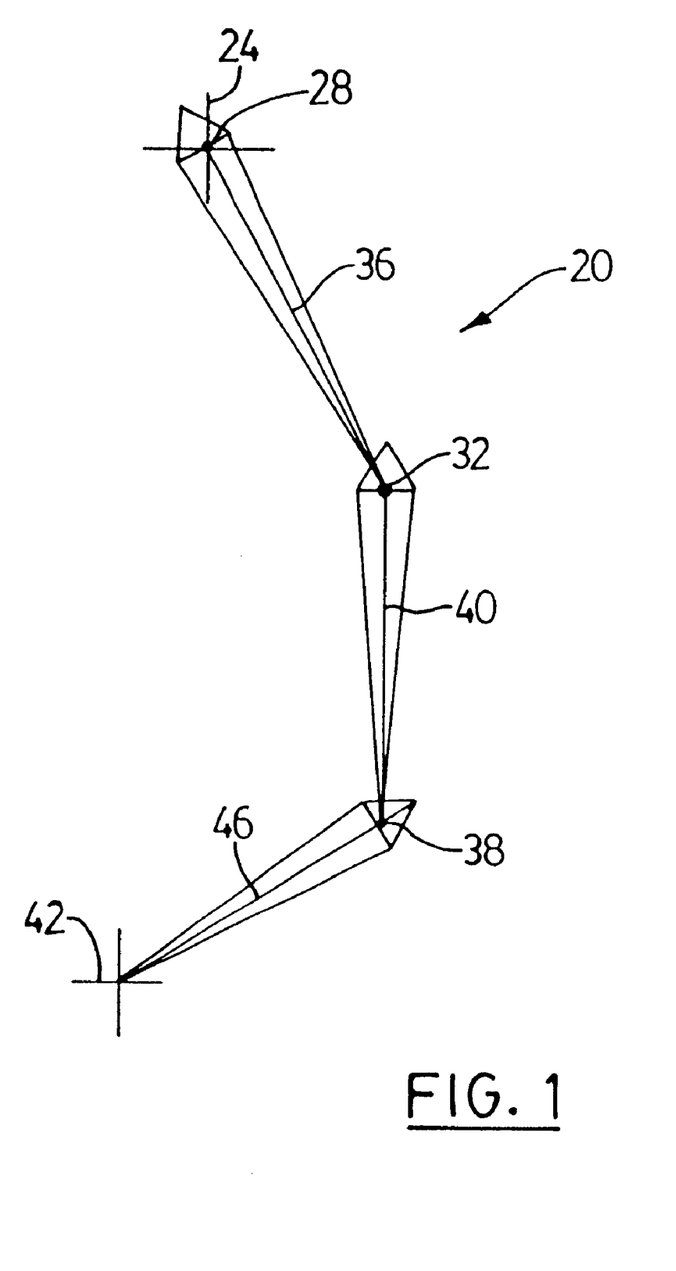
FIG. 1 is a schematic representation of an articulated chain used in prior art skeletons.

FIG. 1 shows a conventional articulated chain 20 for use in a skeleton. Chain 20 includes five elements, namely a chain root 24 (indicated in the Figure by the crosshairs) which is coincident with a first joint 28, a second joint 32 spaced from first joint 28 by a fixed distance 36, a third joint 38 spaced from second joint 32 by a fixed distance 40 and an end effector 42 (indicated in the Figure by the crosshairs) at the end of chain 20, spaced from third joint 38 by a fixed distance 46. As mentioned above, chain 20 is subject to several constraints. For example, joint 32 cannot be translated with respect to joint 28 and, if rotated with respect to joint 28, joint 38 and end effector 42 will also be moved.

Figure 2:
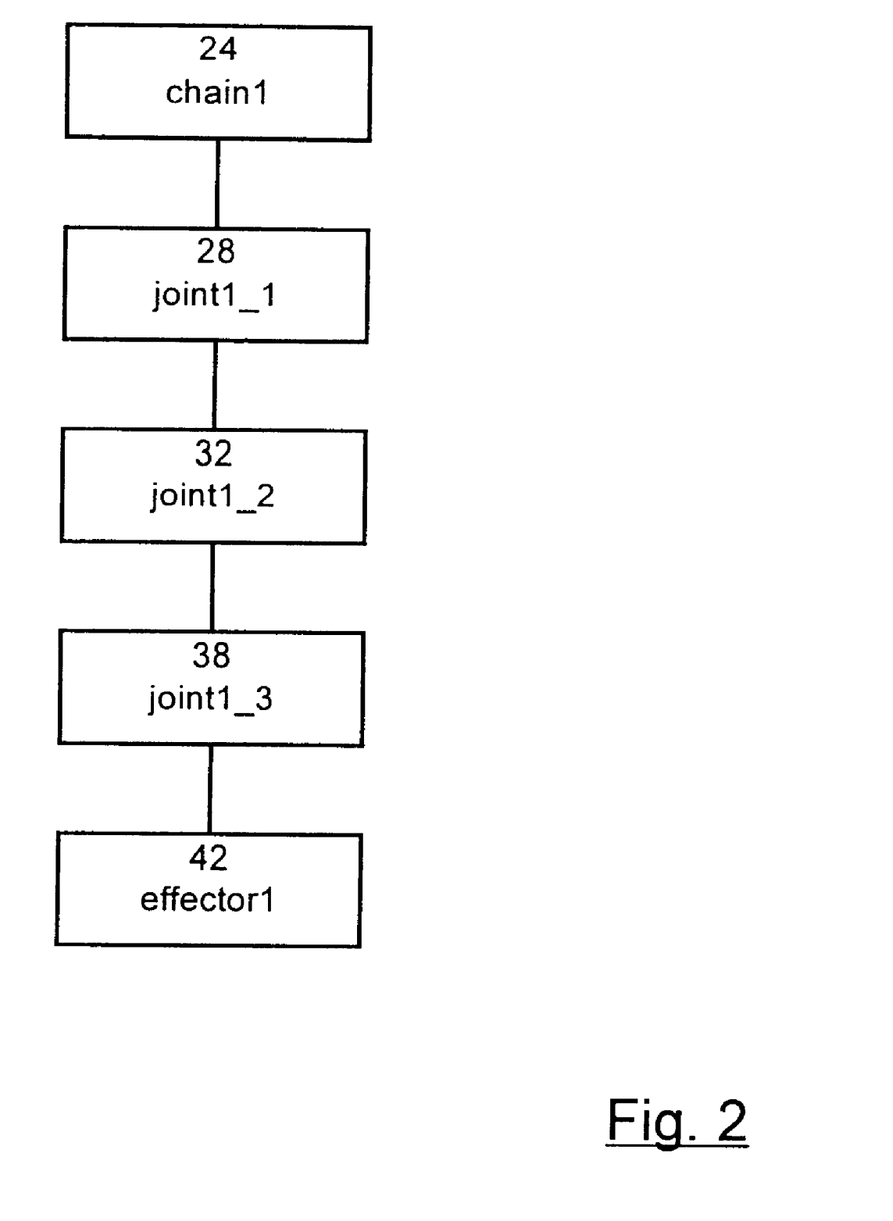
FIG. 2 is a schematic diagram of the skeleton hierarchy of FIG. 1.

FIG. 2 shows a schematic view of the hierarchy of chain 20, and is similar to that shown in the schematic view window of version 3.0 of the SOFTIMAGE|3D product sold by the assignee of the present invention. As shown, the hierarchy's highest element is the root 24 (chain 1 in the Figure), followed by the first joint 28 (joint1_1), second joint 32 (joint1_2), third joint 38 (joint1_3) and the end effector 42 (effector1). As is required for all chains, the chain hierarchy includes a root at its highest level and, for kinematic/dynamic animation purposes, an end effector.

Figure 3:
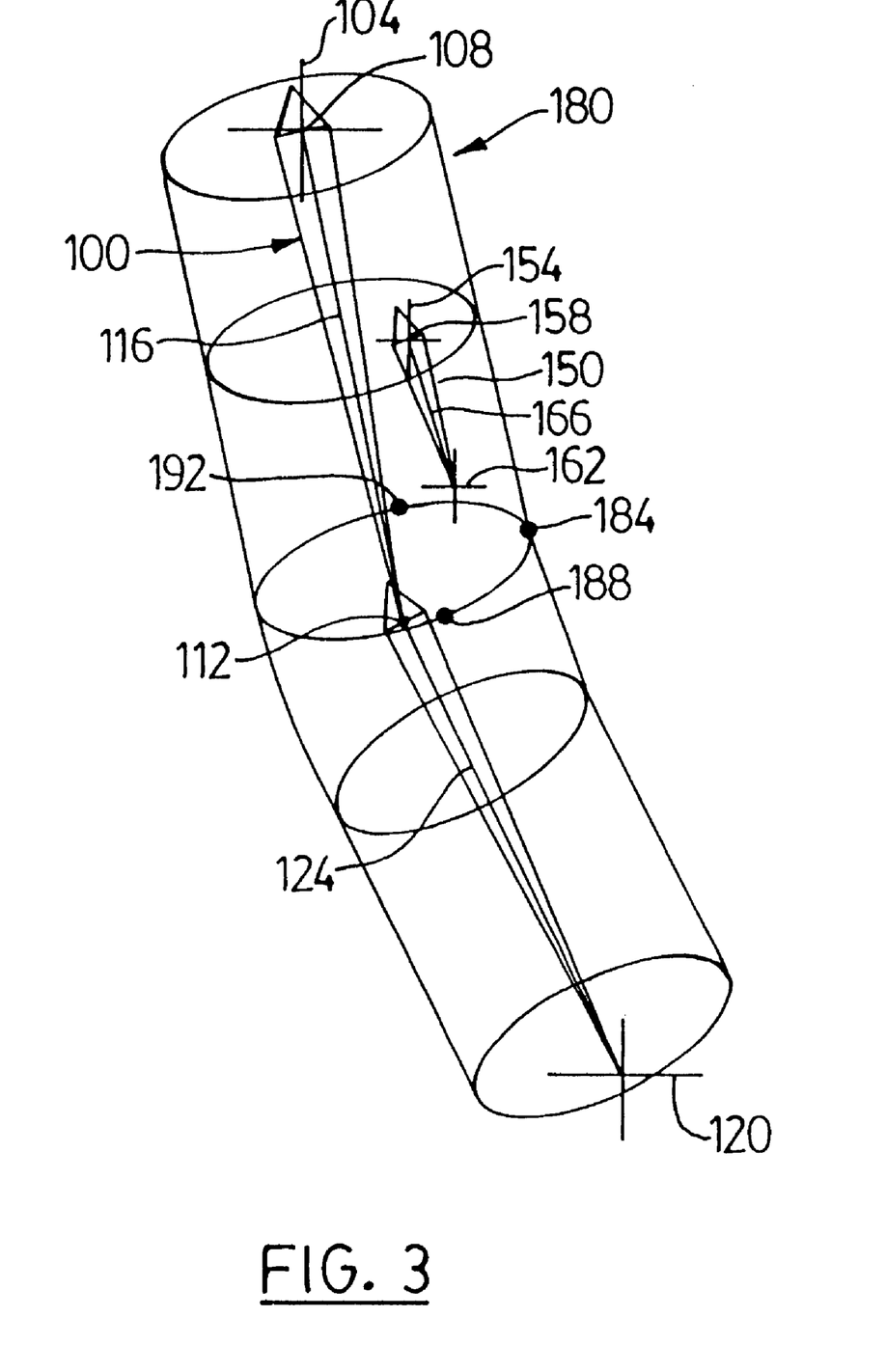
FIG. 3 is a schematic representation of a prior art articulated chain including a dummy chain.
Figure 4:
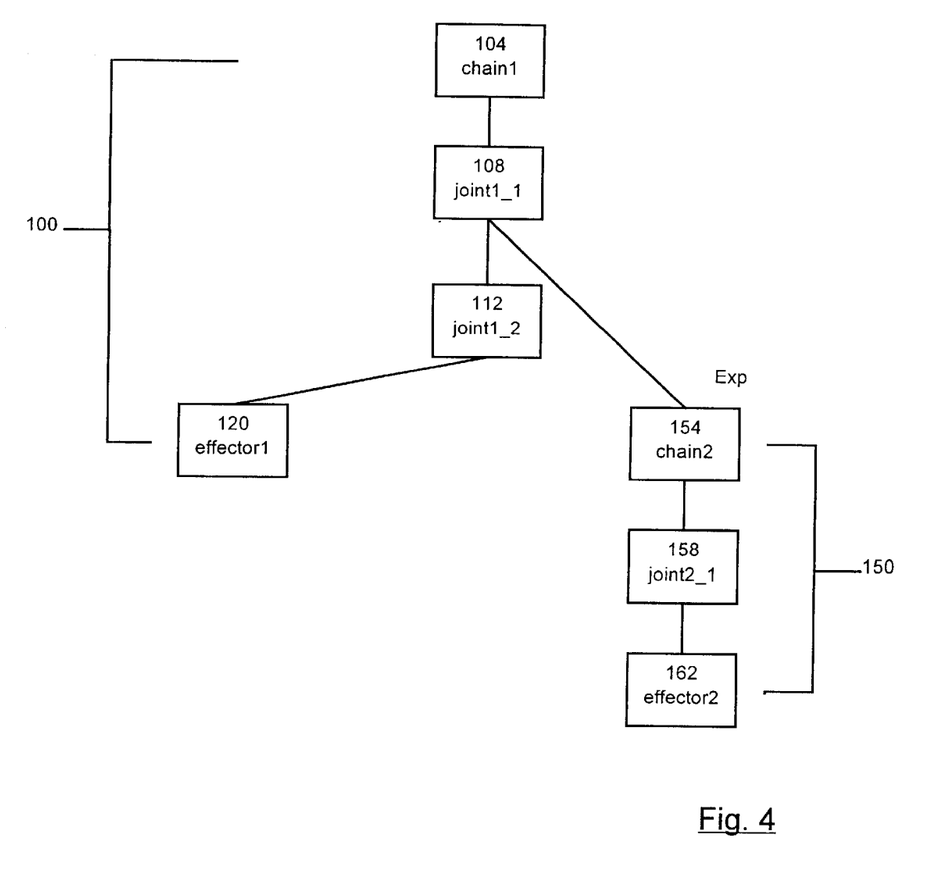
FIG. 4 is a schematic diagram of the skeleton hierarchy of FIG. 3.

In many circumstances the constraints within a chain are desired, or at least acceptable, but in other circumstances wherein improved local control of an envelope applied to a skeleton is desired, these constraints are too limiting. For example, FIGS. 3 and 4 show a skeleton portion comprising a conventional articulated chain 100 and a dummy chain 150 which is used to model a human arm with sufficient detail such that the bulge of a biceps occurs. Specifically, the skeleton portion includes a first chain 100 with a chain root 104 (chain1), indicated by the crosshairs, a first joint 108 (joint1__1) coincident with the root, a second joint 112 (joint1__2) spaced from joint 108 by a fixed distance 116 and an end effector 120 (effector1) spaced from joint 112 by a fixed distance 124. Dummy chain 150 has a chain root 154 (chain2), indicated by the crosshairs, a first joint 158 (joint2__1) coincident with the root and an end effector 162 (effector2) which is spaced from joint 158 by a fixed distance 166. An envelope 180 has been positioned relative to chains 100 and 150 as shown, and the vertices of envelope 180 can be assigned to the skeleton elements as discussed below.

As shown in FIG. 4, the root of dummy chain 150 is a child of joint 108 (joint1__1). Thus, the root of dummy chain 150 will move with joint 108, i.e. -dummy chain 150 will maintain its orientation with respect to joint 108 as joint 112 is rotated about joint 108.

When the vertices of envelope 180 are assigned to skeleton elements, the vertices which are within the area which is to represent the biceps are assigned, either exclusively or on a weighted basis to joint 158. For example, vertex 184 can be assigned fully to joint 158 and vertices 188 and 192 can be assigned to joint 158 with a 50% weighting and to joint 112 with a 50% weighting. In this manner, envelope 180 will be deformed as end effector 120 is rotated towards the root of chain 100. Specifically, vertex 184 will follow joint 158, which moves with joint 108, and vertices 188 and 192 will follow joint 112.

Additional local control can be obtained by defining a mathematical relationship, referred to in the above-mentioned SOFTIMAGE|3D product as an expression, between dummy chain 150 and chain 100. Specifically, as is indicated by the "Exp" label above chain2 in FIG. 4, an expression is defined between the root of chain 150 and joint 112 such that chain 150 will rotate about joint 158 as joint 112 rotates. Expressions are not particularly limited in their definition and can result in chain 150 rotating to the same or a different extent (to mimic larger or smaller biceps for example) as joint 112. Further, the use of expressions is not limited to rotation, and they can be employed to scale, translate, rotate or animate an element in a chain as desired.

However, as mentioned above, while the use of dummy chains can result in greater localized control, they also result in very complex and/or cumbersome skeletons.

Figure 5:
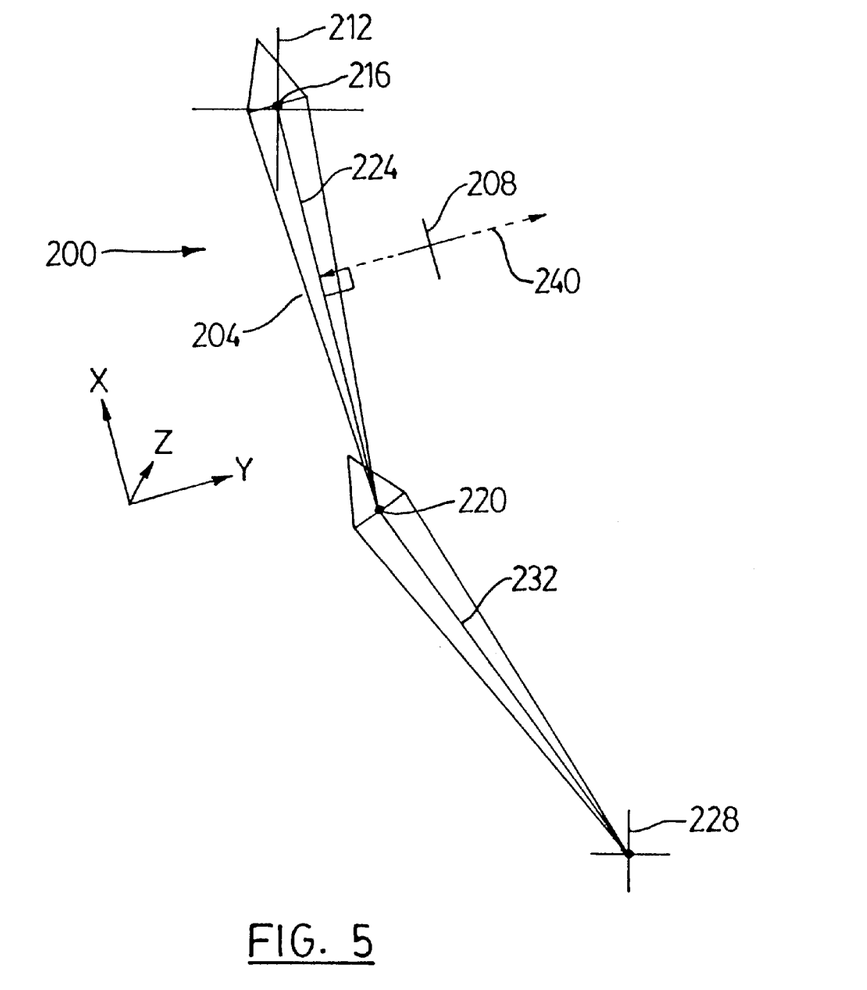
FIG. 5 is a schematic representation of a generalized skeleton in accordance with an embodiment of the present invention.
Figure 6:
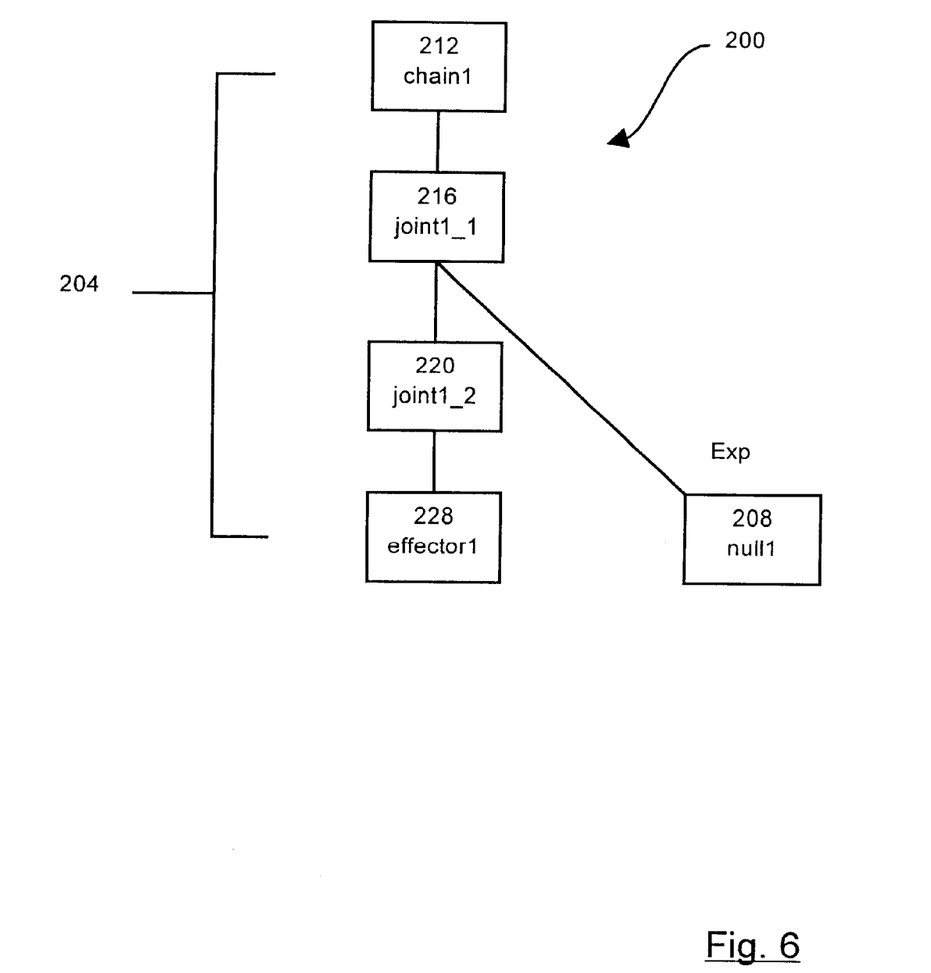
FIG. 6 is a schematic diagram of the skeleton hierarchy of FIG. 5.

In contrast, FIGS. 5 and 6 show a portion of a generalized skeleton 200 in accordance with the present invention which can be used to model the bulge of a biceps. In generalized skeletons, skeleton 200 can include conventional chains, such as chain 204, and other elements, such as 3D objects and/or null models, such as null model 208. A null model, such as null model 208, is essentially a geometric place-holder which does not occupy any volume but which is a skeleton element (i.e.—in the hierarchy of a chain, but not in the chain) and can have flexible envelope vertices assigned to it.

As before, chain 204 comprises a root 212 (chain1), represented by the crosshairs, a first joint 216 (joint__1) which is coincident with root 212, a second joint 220 (joint1__2) spaced from joint 216 by a fixed distance 224 and an end effector 228 (effector1) spaced from joint 220 by a fixed distance 232. Null model 208 (null 1) is located at the approximate position wherein the bulge of a biceps would occur. FIG. 6 shows the schematic of chain 204 and null model 208 and, as shown in the Figure, null model 208 is a child of joint216 (joint1__1) and will thus rotate with joint 216 (joint1__1). Further, as indicated by the "Exp" label in FIG. 6, an expression has been defined for null model 208 which expression results in the scaling of null model 208 as joint 220 rotates. Specifically, the expression results in the scaling of the y-axis for null model 208. It should be noted that, in SOFTIMAGE|3D the xyz co-ordinate axes are defined relative to each joint with the x axis extending towards the next joint and with rotation at the joint occurring about the z axis. As before, an envelope can have appropriate ones of its vertices assigned, in whole or in part, to null model 208 and the scaling of the y-axis for null model 208 results in those envelope vertices assigned to null model 208 being moved toward and/or away from the x-axis (which extends from joint 212 to joint 220), the resulting deformation of the envelope thus mimicking the bulging of a biceps. This example is discussed further below, with reference to FIGS. 12 and 13.

Generalized skeletons, such as that shown in FIGS. 5 and 6, are defined in SOFTIMAGE|3D V3.5 by defining and/or selecting the elements, such as chains, null models and/or 3D objects, to be included in the skeleton and arranging the elements into a skeleton hierarchy. If the skeleton includes multiple chains, then the roots of all but one chain are parented to the effector of another chain, as appropriate, and the one non-parented chain root will be the skeleton root. Also, a model may include multiple skeletons, each of which will have it's own chain root.

Non-chain elements such as null models and/or 3D objects are parented to a desired joint in a desired chain or can be parented to other null models and/or 3D objects and/or can be the chain root. The only restriction on the construction of a generalized skeleton hierarchy is that non-chain elements cannot appear in the hierarchy between the chain root and a effector.

Once the generalized skeleton hierarchy is defined, relational information, such as the range of movement for a joint and/or expressions for null models to define translation, rotation, scaling and/or animation of the null model can be defined. Alternatively, definition of this relational information may be deferred until later and subsequently defined.

While the differences between the simple skeleton portions of FIG. 3 and FIG. 5 may appear to be minimal, for more complex skeletons and skeleton portions which are typically employed in actual use, the use of generalized skeletons can greatly simplify the design and construction of skeletons with a desired high level of local control.

Figure 7:
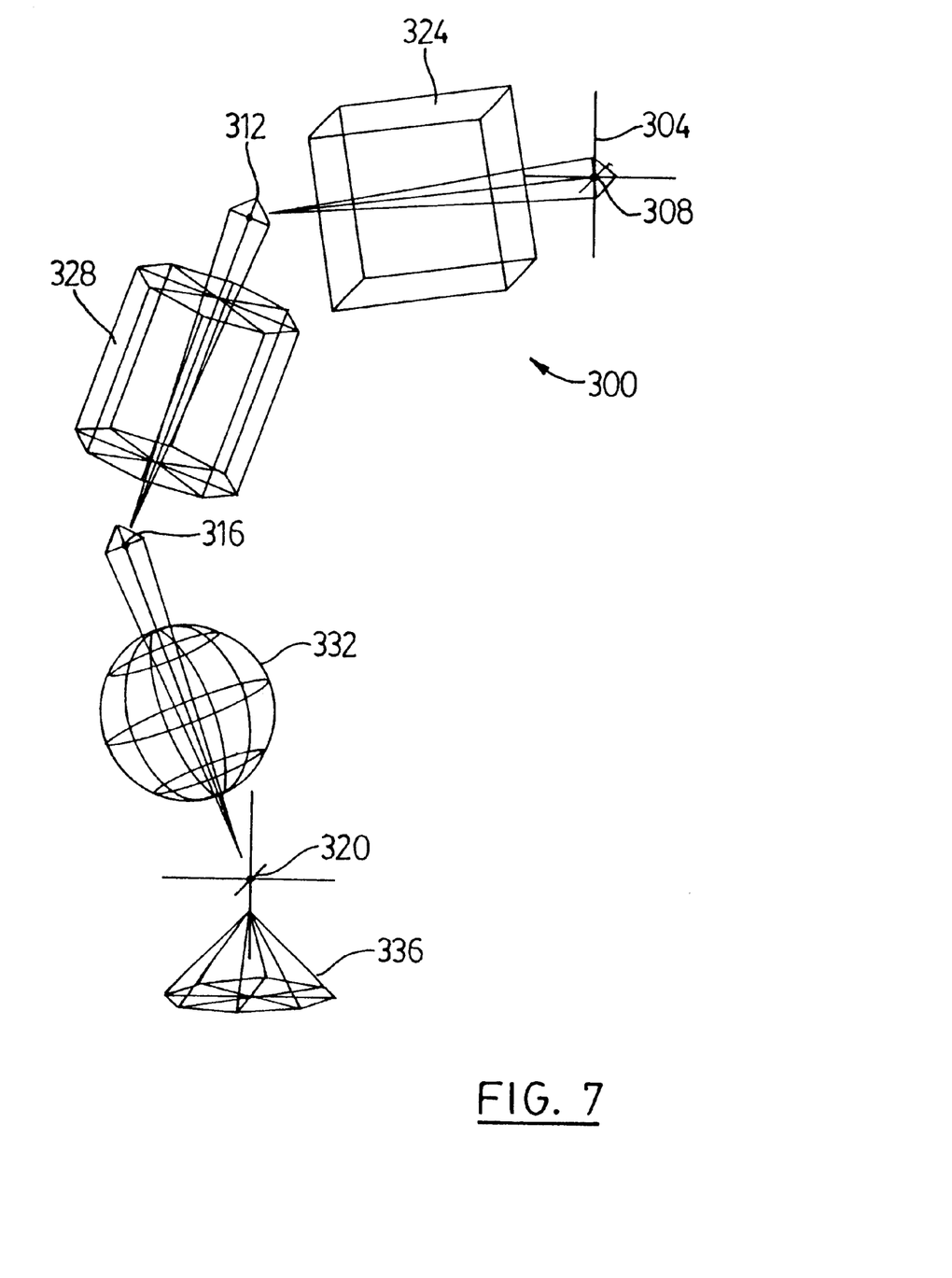
FIG. 7 is a schematic representation of a generalized skeleton including 3D objects in accordance with an embodiment of the present invention.
Figure 8:
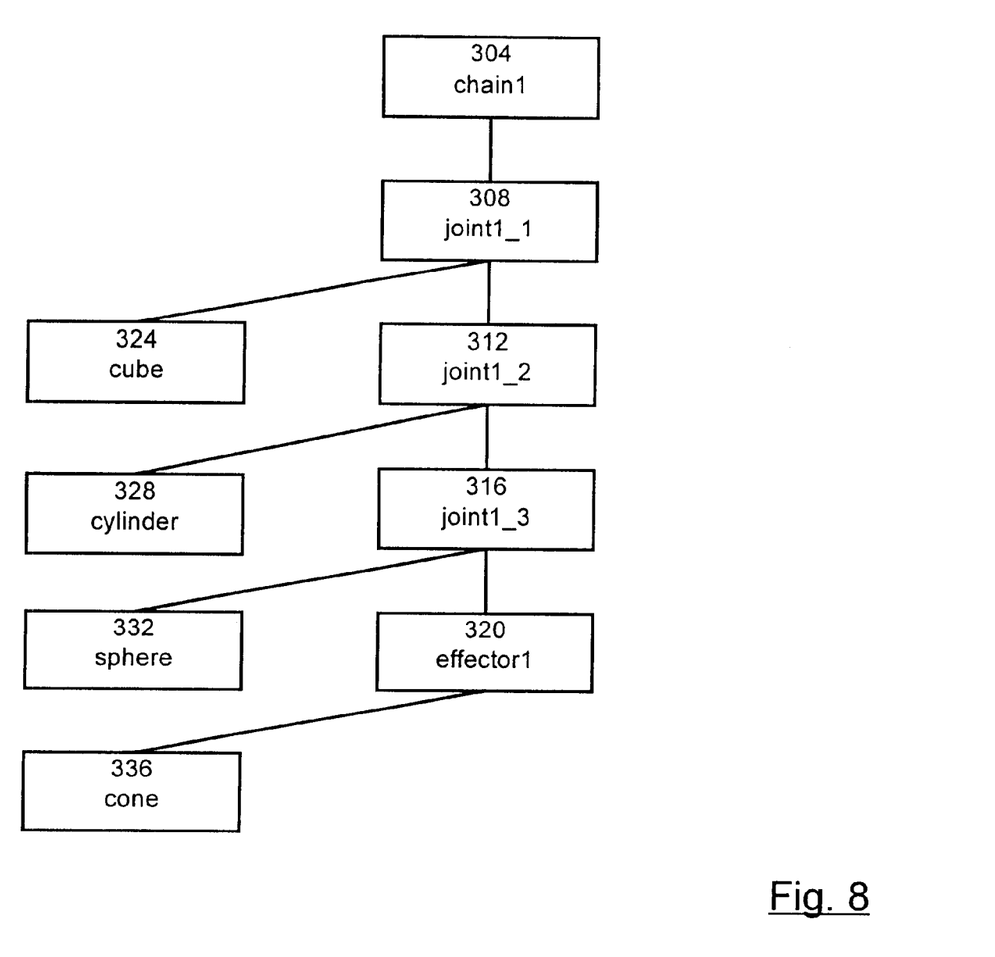
FIG. 8 is a schematic diagram of the skeleton hierarchy of FIG. 7.

As shown in FIGS. 7 and 8, and as mentioned above, generalized skeletons can also include 3D objects as elements in their hierarchies. In FIG. 7, skeleton 300 has been defined with a root 304 (indicated by the crosshairs) which is coincident with a first joint 308. Skeleton 300 also includes a second joint 312, which is spaced from first joint 308, a third joint 316, which is spaced from second joint 312, and an end effector 320. In addition to these skeleton elements, skeleton 300 also includes four 3D objects which have been included in its hierarchy. Specifically, a cube 324 is included as a child of first joint 308 (joint1__1) (i.e.— it is parented to joint1__1), a cylinder 328 has been included as a child of second joint 312 (joint1__2), a sphere 332 has been included as a child of third joint 316 (joint1__3) and a cone 336 has been included as a child of end effector 320 (effector1). As will be apparent to those of skill in the art, by parenting the 3D objects to skeleton elements, the objects move with the chain. For example, cube 324 will move with first joint 308 and cylinder 328 will move with second joint 312.

For kinematic and/or animation purposes, each 3D object in skeleton 300 is represented as a single point, located by default at the geometric centre of the object. Thus, cube 324 is represented as a point at its volumetric centre and that point moves with the skeleton element to which it is parented, in this case first joint 308.

Unlike other skeleton elements such as joints, roots and chains, 3D objects which are included in a skeleton hierarchy are rendered in the animations and images produced with the skeleton and are thus visible. This allows the animation artist to achieve various effects as may be desired. It will be apparent to those of skill in the art that skeletons with 3D objects in their hierarchies can also have flexible envelopes assigned to various elements in the skeleton.

Figure 9:
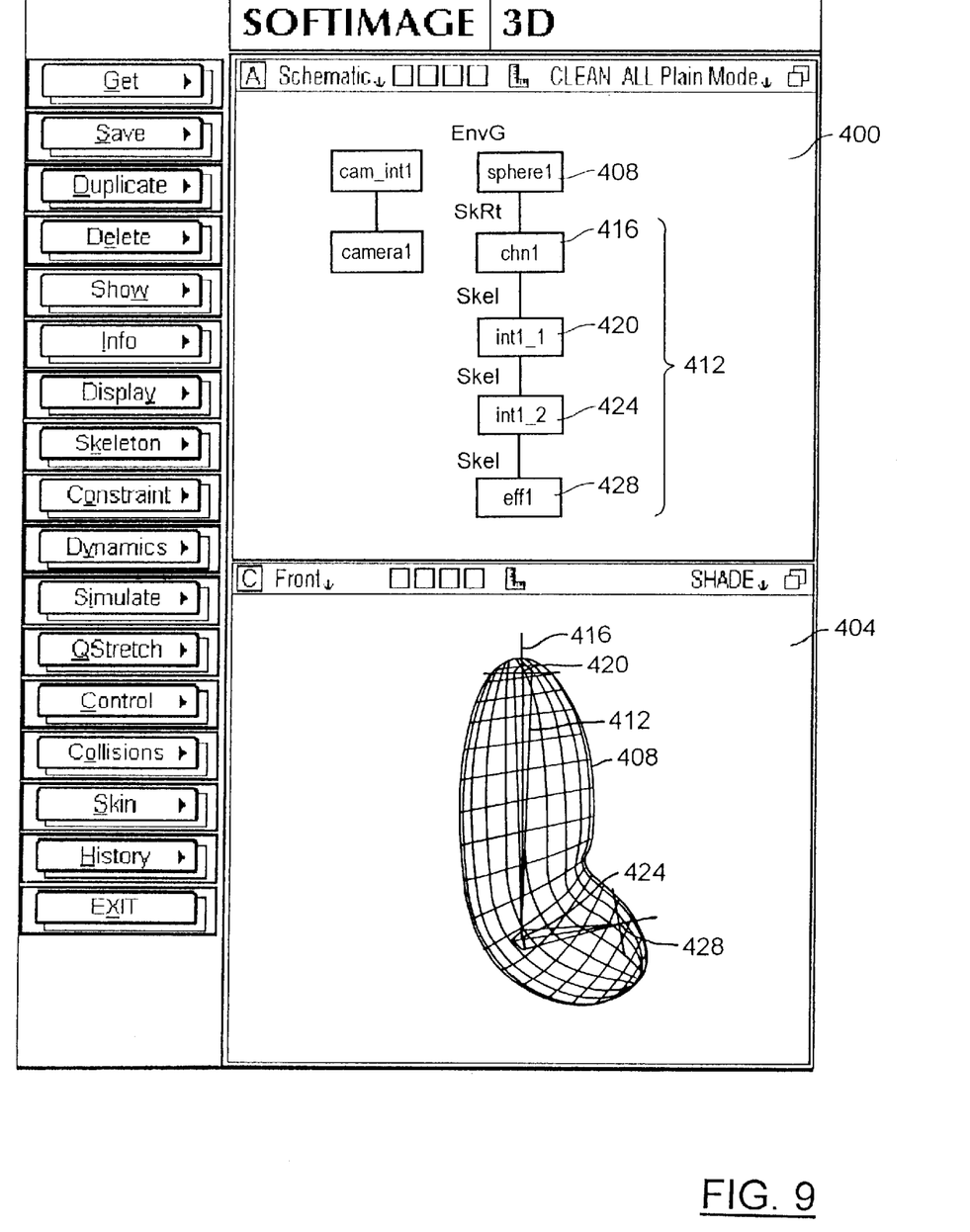
FIG. 9 is a screen capture showing a conventional skeleton of an articulated chain and flexible envelope.

FIG. 9 shows a screen display from SOFTIMAGE|3D Version 3.51 with a schematic view window 400 and a front wireframe window 404 which show an example of a ellipsoidal flexible envelope 408 whose vertices have been assigned to a conventional articulated chain 412. Chain 412 comprises a chain root (chn1) 416, a first joint (jnt1_1) 420, a second joint (jnt1_2) 424 and an end effector (eff1) 428. As shown in the Figure, end effector 428 has been moved upwards, to the right of window 404, distorting envelope 408 as shown.

Figure 10:
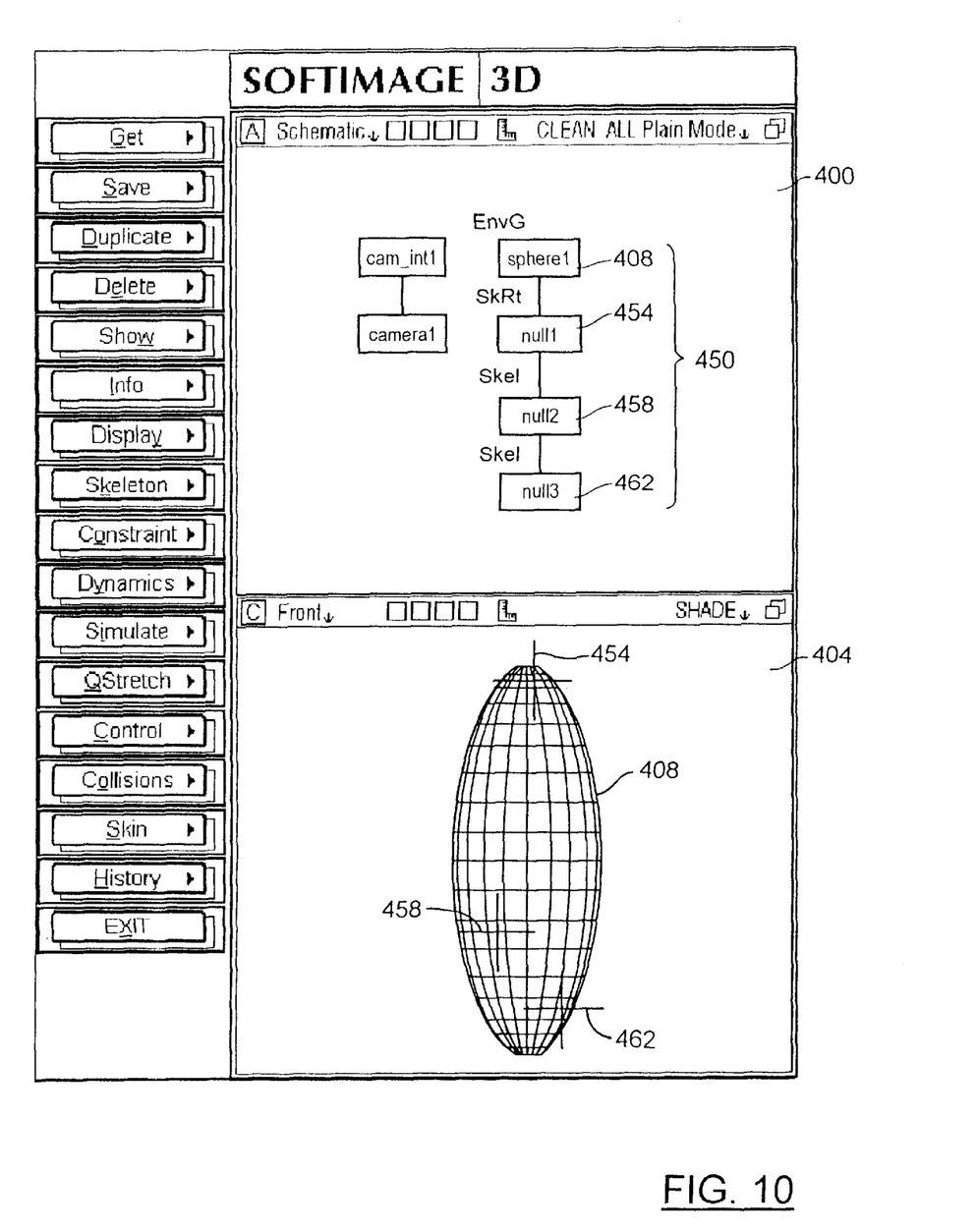
FIG. 10 is a screen capture showing a generalized skeleton and flexible envelope in accordance with an embodiment of the present invention.

FIG. 10 shows a screen display of a generalized skeleton 450 in accordance with the present invention. As best shown in schematic window 400, skeleton 450 comprises three null models, null1 454, null2 458 and null3 462 respectively, to which the vertices of ellipsoidal flexible envelope 408 have been assigned.

Figure 11:
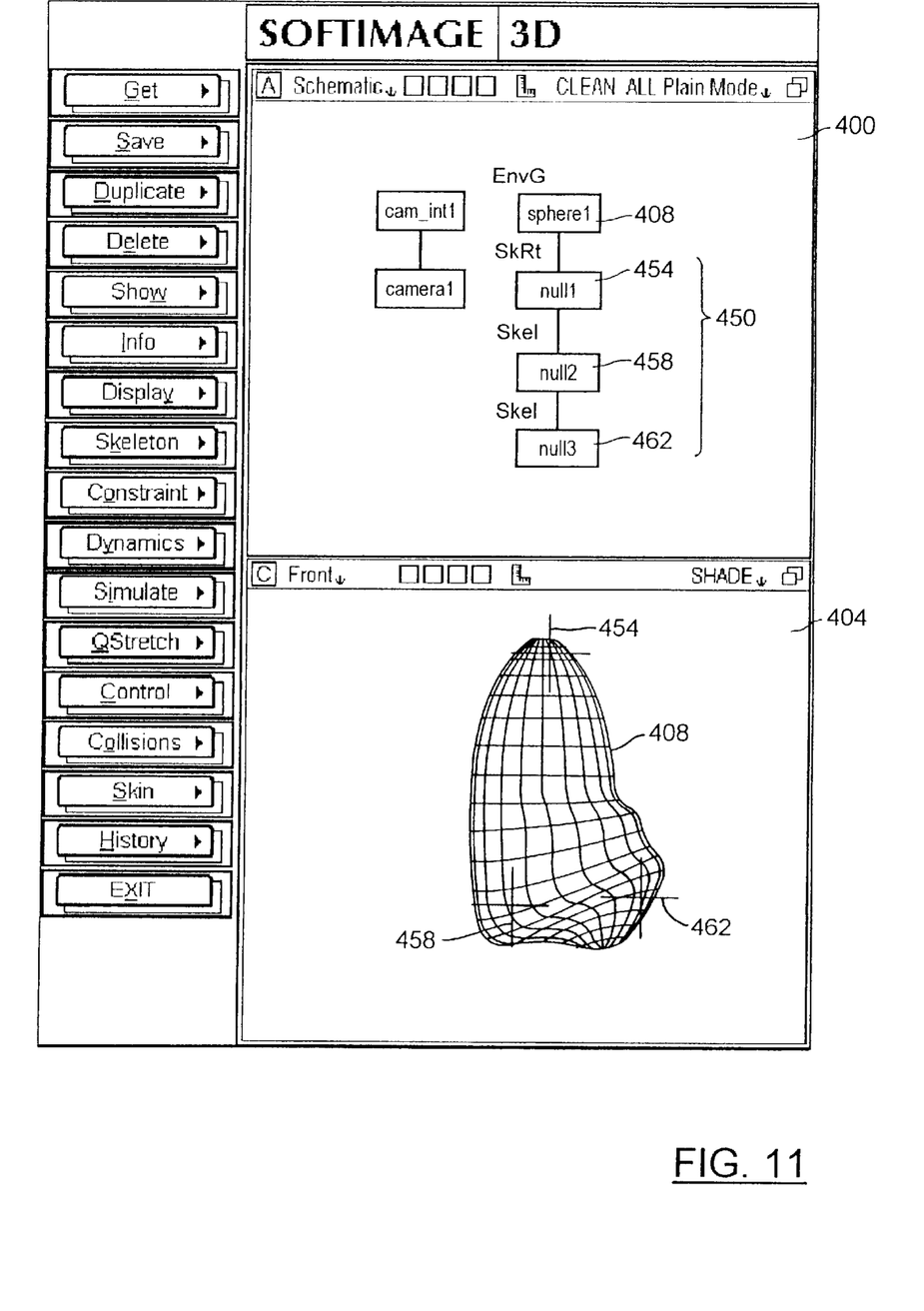
FIG. 11 is a screen capture showing the generalized skeleton and flexible envelope of FIG. 10 after one of the skeleton elements has been moved.

FIG. 11 shows the resulting deformation of envelope 408 when null3 462 has been moved upward and to the right of front wireframe window 404. As can be seen, the resulting deformation of envelope 408 is quite different from that in FIG. 9. The advantages of the use of null models will be apparent to those of skill in the art in that movement of any one or more of null models null1 454, null2 458 or null3 462 can be performed independently of the other null models, the null models can be translated with respect to each other and, generally, the use of null models provides a skeleton which is not subject to many of the constraints of those constructed from articulated chains.

Figure 12:
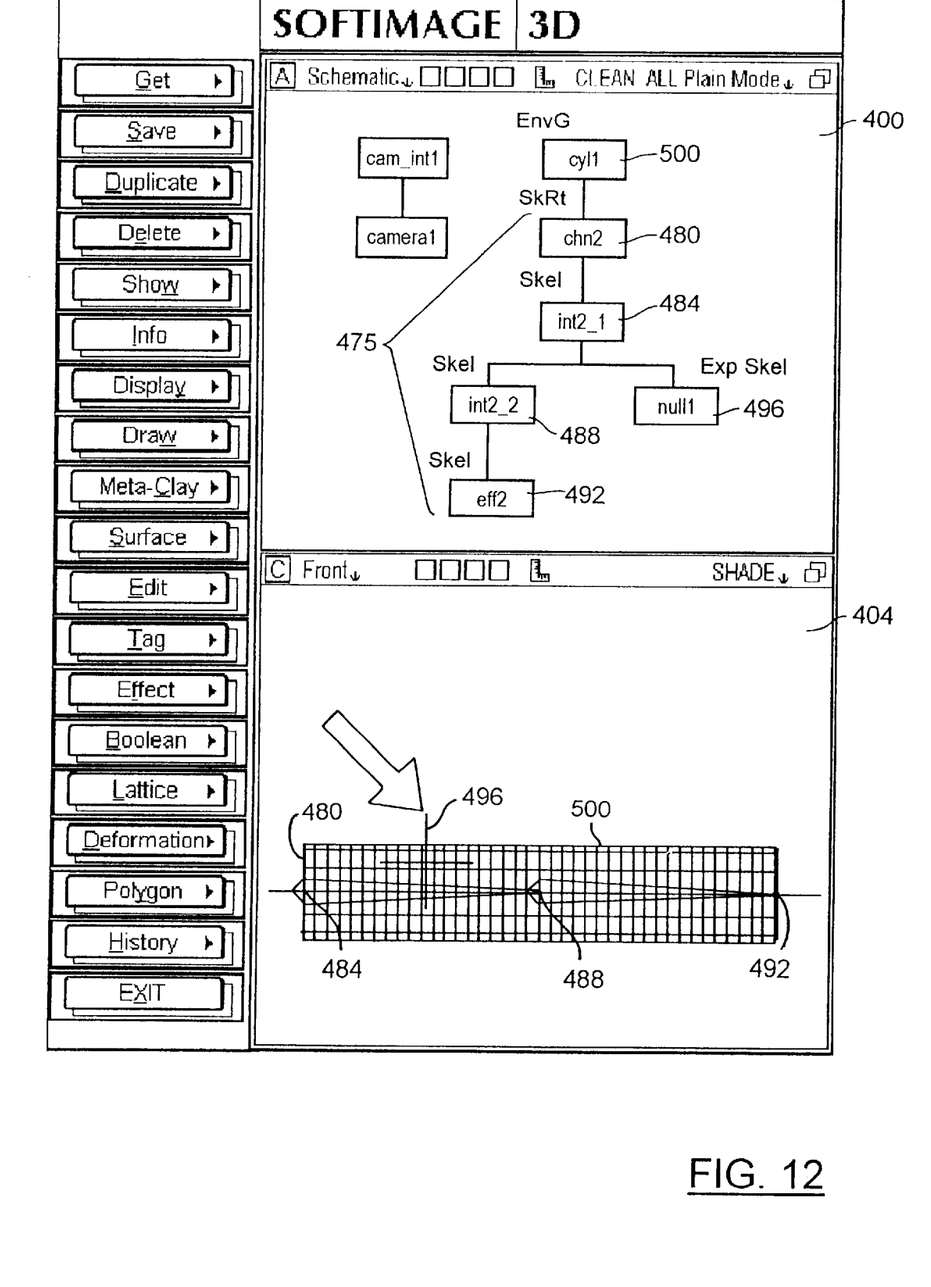
FIG. 12 is a screen capture showing another generalized skeleton and flexible envelope in accordance with an embodiment of the present invention.

FIG. 12 shows the use of a skeleton hierarchy in accordance with the present invention which includes both an articulated chain and a null model which is used to model the bulge of a muscle, such as a human biceps, as was described above with reference to FIG. 5. A shown in the schematic view window 400, this skeleton includes an articulated chain 475 with a chain root (chn2) 480, a first joint (jnt2_1) 484, a second joint (jnt2_2) 488, and an end effector (eff2) 492. As is also shown, first joint (jnt2_1) 484 is the parent of a null model (null1) 496 and thus null model (null1) 496 will move with first joint (jnt2_1) 484. For example, if first joint 484 is rotated, null model (null1) 496 will be rotated with it. It should be noted again that null model (null1 496 is not part of articulated chain 475, as articulated chains can only include a root, joints and an end effector, but is part of the skeleton hierarchy. Specifically, null model (null1) 496 is parented to first joint (joint2_1) 484 and is not between chain root (chn2) 480 and end effector (eff2) 492.

The vertices of a flexible envelope 500, which is in the general form of a cylinder, have been assigned to skeleton 475 with the vertices adjacent null model (null1) 496 being assigned, with at least a partial weighting to null model (null1) 496. As indicated by the "Exp" label 498 above null model (null1) in schematic view window 400, a relationship has been defined for null model (null1) 496. Specifically, a mathematical relationship has been defined such that the y-axis of null model (null1) 496 is scaled at first joint (jnt2_1) 484 as second joint (jnt2_2) 488 is rotated. This scaling of the y-axis results in the vertices assigned to null model (null1) 496 moving away from the segment defined between first joint (jnt2_1) 484 and second joint (jnt2_2) 488 as end effector 492 is moved to rotate second joint (jnt2_2) 488. As mentioned above, in SOFTIMAGE|3D, the xyz co-ordinate axes are defined relative to each joint and thus scaling of the y-axis for null model (null1) 496 will always result in envelope vertices assigned to null model (null1) 496 moving toward or away from the segment between first joint (jnt2_1) 484 and second joint (jnt2_2) 488.

Figure 13:
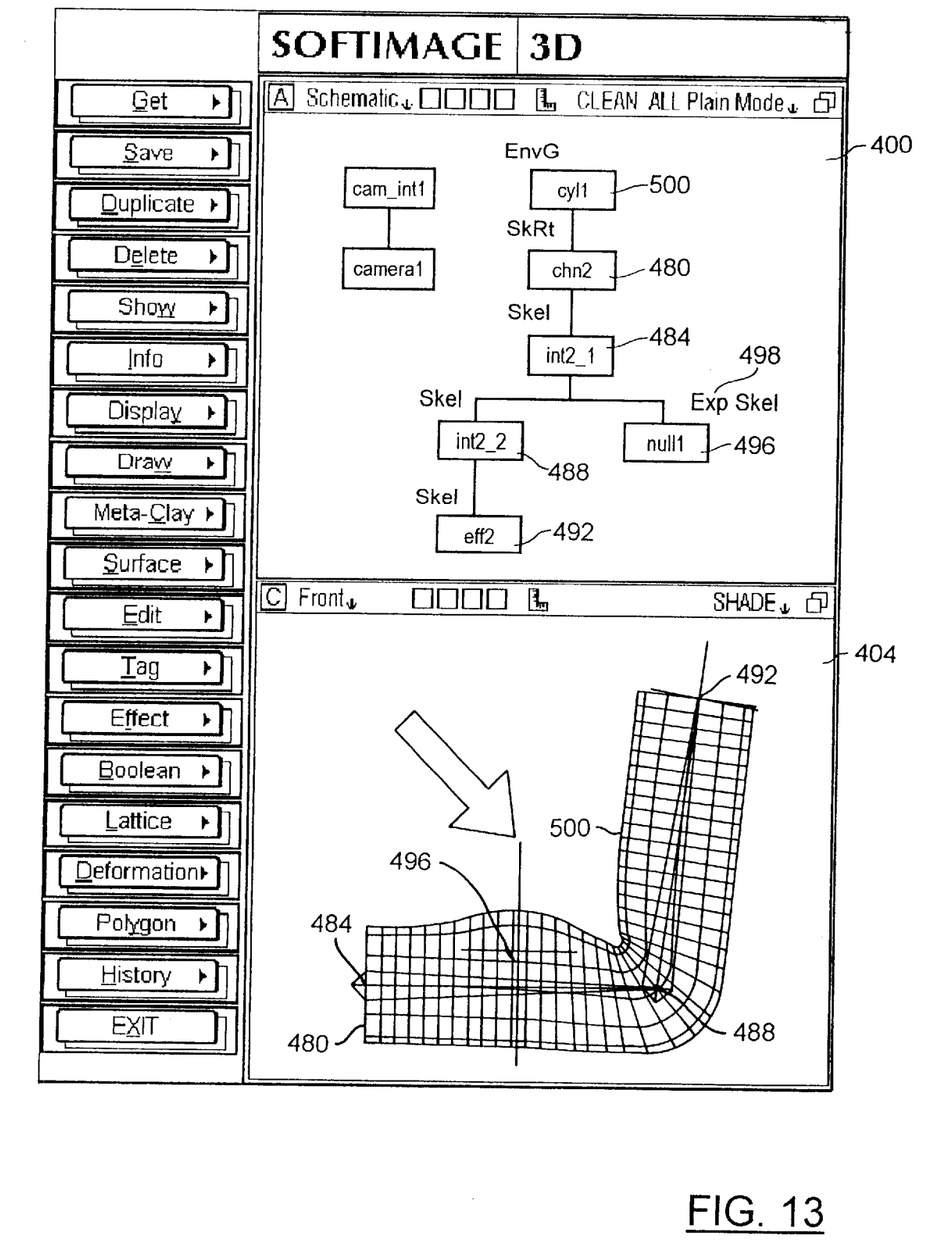
FIG. 13 is a screen capture showing the generalized skeleton and flexible envelope of FIG. 12 after one of the skeleton elements has been moved.

FIG. 13 shows the result of the scaling up of the y-axis null model (nulll) 496 as second joint (jnt2_2) 488 is rotated. In this Figure, the y-axis has been scaled up, moving the envelope vertices assigned to null model (null1) 496 away from the segment defined between first joint ((jnt2_1) 484 and second joint (jnt2_2) 488, resulting in a biceps-like bulge in envelope 500.

As will be apparent to those of skill in the art, the use of null models and/or 3D objects in skeletons employed in animation models provides a flexible and powerful method for animators. In particular, the use of null models allows animates provides increased and /or eased local control for complex models. Also, the resulting models can be more intuitive to use than those previously employed.

The above-described embodiments of the invention are intended to be examples of the present invention and alterations and modifications may be effected thereto, by those of skill in the art, without departing from the scope of the invention which is defined solely by the claims appended hereto.

I claim:

1. A method of constructing a generalized skeleton for an animation model, comprising the steps of:
   (i) defining a set of skeleton elements to be included in said skeleton, said skeleton elements including at least one articulated chain element and at least one non-chain element which can be scaled, rotated or transformed in an animation independently of the at least one articulated chain element and whose distance relative to the at least one articulated chain element can be changed in the animation;
   (ii) arranging said set of skeleton elements into a skeleton hierarchy, the articulated chain elements defining in the skeleton hierarchy a chain comprising a root and an end effector, the non-chain elements being excluded from the chain; and
   (iii) defining for each said skeleton element in said set a relation between said each skeleton element and another one of said skeleton elements in said set.

2. The method of claim 1 wherein said at least one non-chain element is a 3D object.

3. The method of claim 1 wherein said at least one non-chain element is a null object.

4. The method of claim 1 further comprising the step of (iv) assigning at least one vertex of an envelope to be rendered to at least one skeleton element.

5. The method of claim 1 wherein the relation results in at least one of translation, rotation, axis scaling and animation of the at least one non-chain element.

6. The method of claim 1 wherein the at least one non-chain element is parented to at least one of the articulated chain elements in the chain within the defined skeleton hierarchy.

7. The method of claim 6 wherein said at least one non-chain element is a null model.

8. The method of claim 1 wherein the chain is parented to the at least one non-chain element within the defined skeleton hierarchy.

9. The method of claim 8 wherein at least one non-chain element is a null model.

10. A method of constructing an animation model including a generalized skeleton including at least one envelope, comprising the steps of:
  (i) defining a set of skeleton elements to be included in said skeleton, at least one element of said set being an articulated chain element and, at least one other of said set being a non-chain element which can be scaled, rotated or transformed in an animation independently of the articulated chain elements in said set and whose distance relative to the articulated chain elements can be changed in [an] the animation;
  (ii) arranging said set of skeleton elements into a skeleton hierarchy the articulated chain elements defining in the skeleton hierarchy a chain comprising a root and an end effector, the non-chain elements being excluded from the chain;
  (iii) defining for each said skeleton element in said set [information comprising a relational and/or mathematical relationships between said element and at least one other element] a relation between said each skeleton element and another one of said skeleton elements in said set;
  (iv) selecting at least one envelope for use with said skeleton; and
  (v) assigning vertices of said at least one envelope to at least one element in said set.

11. The method of claim 10 wherein said at least one non-chain element is a 3D object.

12. The method of claim 10 wherein said at least one non-chain element is a null model.

13. The method of claim 10 wherein the at least one non-chain element is parented to at least one of the articulated chain elements in the chain.

14. The method of claim 13 wherein the relation includes a mathematical relationship responsive to movement of the articulated chain to translate, rotate, scale or animate the at least one non-chain element.

15. The method of claim 10 wherein the chain is parented to the at least one non-chain element.

16. An animation system comprising:
  element input means to allow a user to define a set of skeleton elements including at least one articulated chain element and, at least one non-chain element which can be scaled, rotated or transformed [independently of articulated chain elements in said set] in an animation independently of the at least one articulated chain element and whose distance relative to [articulated chain elements in said set] the at least one articulated chain element can be changed in the animation;
  hierarchical input means to allow said user to arrange said set of skeleton elements into a skeleton hierarchy, and to allow said user to define with the articulated chain elements a chain in the skeleton hierarchy, the chain comprising a root and an end effector, and to allow said user to exclude the non-chain elements from the chain;
  relational input means to allow said user to define [relational information and/or mathematical relationships for each element in said set of elements] for each said skeleton element a relation between said each skeleton element ad another one of said skeleton elements;
  envelope input means to allow said user to assign vertices of at least one envelope to at least one of the skeleton elements [in said set of elements];
  animation means to animate said skeleton elements; and
  rendering means to render images of said at least one envelope.

17. The system according to claim 16 wherein said at least one non-chain element is a 3D object and said rendering means renders said 3D object and said at least one envelope in said rendered images.

18. The system according to claim 16 wherein said at least one non-chain element is a null model.

19. The system of claim 16 wherein the animation means employs inverse kinematics to animate the skeleton elements.

20. The system of claim 16 wherein the animation means employs dynamics to animate the skeleton elements.

21. The system of claim 16 wherein the animation means employs forward kinematics to animate the skeleton elements.

22. The system of claim 16 wherein the relation comprises a definition of a joint in the chain to which the at least one non-chain element is parented.

23. The system according to claim 22 further including a mathematical relationship defined for said at least one non-chain element and defining a translation, rotation, scaling and/or animation of said at least one non-chain element.

24. An apparatus for storing a three-dimensional model, comprising:
  a computer readable medium;
  information stored on the computer readable medium such that, when interpreted by a computer, the information describes:
  a skeleton defined by set of skeleton elements, wherein the set of skeleton elements includes at least one articulated chain element and at least one non-chain element, wherein each non-chain element can be scaled, rotated or transformed in an animation independently of the at least one articulated chain element and has a distance relative to the at least one articulated chain element that can be changed in the animation, wherein the at least one articulated chain element defines a chain, wherein the at least one non-chain is excluded from the chain, and wherein each skeleton element has a defined relation between the skeleton element and another one of the skeleton elements in the set; and
  an envelope associated with the skeleton.

25. The apparatus of claim 24 wherein the at least one non-chain element is a null object.

26. The apparatus of claim 24 wherein the at least one non-chain element is a three-dimensional object.

27. The apparatus of claim 24 wherein the defined relation results in at least one of translation, rotation, axis scaling and animation of the at least one non-chain element.

28. The apparatus of claim 24 wherein the at least one non-chain element is parented to at least one of the articulated chain elements in the chain.

29. The apparatus of claim 24 wherein the chain is parented to the at least one element.

30. The apparatus of claim 24 wherein the relation includes a mathematical relationship responsive to movement of the articulated chain to translate, rotate, scale or animate the at least one non-chain element.

31. The apparatus of claim 24 wherein the relation includes a definition of a joint in the chain to which the at least one non-chain element is parented.

32. The apparatus of claim 31 wherein the defined relation results in at least one of translation, rotation, axis scaling and animation of the at least one non-chain element.

33. The apparatus of claim 31 wherein the relation includes a mathematical relationship responsive to movement of the articulated chain to translate, rotate, scale or animate the at least one non-chain element.

34. A system for constructing a three-dimensional model, comprising:

means for enabling a user to define a skeleton defined by set of skeleton elements, wherein the set of skeleton elements includes at least one articulated chain element and at least one non-chain element, wherein each non-chain element can be scaled, rotated or transformed in an animation independently of the at least one articulated chain element and has a distance relative to the at least one articulated chain element that can be changed in the animation, wherein the at least one articulated chain element defines a chain, wherein the at least one non-chain is excluded from the chain, and wherein each skeleton element has a defined relation between the skeleton element and another one of the skeleton elements in the set; and means for enabling a user to define an envelope associated with the skeleton.

35. The system of claim 34 wherein the at least one non-chain element is a null object.

36. The system of claim 34 wherein the at least one non-chain element is a three-dimensional object.

37. The system of claim 34 wherein the defined relation results in at least one of translation, rotation, axis scaling and animation of the at least one non-chain element.

38. The system of claim 34 wherein the at least one non-chain element is parented to at least one of the articulated chain elements in the chain.

39. The system of claim 34 wherein the chain is parented to the at least one non-chain element.

40. The system of claim 34 wherein the relation including mathematical relationship responsive to movement of the articulated chain to translate, rotate, scale or animate the at least one non-chain element.

41. The system of claim 34 wherein the relation includes a definition of a joint in the chain to which the at least one non-chain element is parented.

42. The system of claim 41 wherein the defined relation results in at least one of translation, rotation, axis scaling and animation of the at least one non-chain element.

43. The system of claim 41 wherein the relation includes a mathematical relationship responsive to movement of the articulated chain to translate, rotate, scale or animate the at least one non-chain element.

\* \* \* \* \*